May 7, 1929.  E. L. WILKINSON  1,712,240
POWER BRAKING DEVICE
Filed Feb. 12, 1926

INVENTOR:-
Elmer L. Wilkinson
BY Edward E. Longan
ATTORNEY.

Patented May 7, 1929.

1,712,240

UNITED STATES PATENT OFFICE.

ELMER L. WILKINSON, OF ST. LOUIS, MISSOURI.

POWER BRAKING DEVICE.

Application filed February 12, 1926. Serial No. 87,751.

My invention relates to improvements in power braking devices, and has for its primary object a braking device controlled by a pedal and in which the motor of an automobile furnishes the power for setting the brakes.

A further object is to construct a braking device which has the motor furnishing the power for setting the brakes, the construction being such that the revolutions of the motor crankshaft will be constant at all times during the setting of the brakes. In this connection a means is provided for either speeding up the motor or reducing its speed automatically at the time that the brakes are set so that regardless of whether the motor is throttled down to its lowest speed or traveling over the road at its highest speed, it will be automatically throttled so that the braking power exerted will be constant. In other words, while the motor furnishes the power for setting the brakes, a predetermined motor speed will accomplish this purpose.

Figure 4:
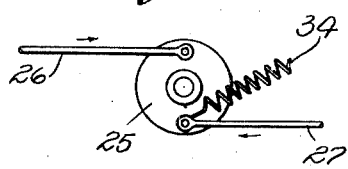
Fig. 4 is an enlarged view illustrating the manner of connecting the brake operating rods to the setting mechanism.

In carrying out my invention I employ a motor 5 which is preferably of the gasoline type and which is provided with a fly wheel 6. The periphery of this fly wheel is provided with gear teeth 7. This much of my construction is commonly used for automobiles, the gear teeth 7 being adapted to connecting with the starter. Meshing with the gear teeth 7 is a gear 8 which is carried by a shaft 9. The shaft 9 extends into a housing 10 and carries on its end, which projects into the housing, a friction disk 11. The housing 10 is bolted preferably to the motor block although other means for supporting the same may be employed. The housing 10 is provided with a web 12 which has a bearing 13 formed integral therewith. This bearing is adapted to receive the sleeve 14, the sleeve also acting as a bearing for the shaft 9. The sleeve 14 is provided with a key 15 for slidably and rotatably securing the disk 16 thereto. Slidably mounted on the sleeve 14 is a collar 16ª with which a fork 17 engages. The fork 17 is mounted on a shaft 18 to which the arm 19 is secured at its upper end. The lower end of the arm 19 has attached thereto a rod 20 and which in turn is slidably secured to the end 21 of the foot lever or pedal 22, this lever or pedal being the ordinary service brake pedal in a motor vehicle. The sleeve 14 is provided with a bevel gear 23 which meshes with a similar gear 24. The gear 24 is mounted on a shaft to which is rigidly affixed a disk 25. Pivotally secured to the disk 25 are rods 26 and 27, which lead respectively to the front and rear brakes 28 and 29 and upon the rotation of the disks the rods are pulled in the directions indicated by the arrows in Fig. 4, thus tightening the brakes.

Secured to the foot lever 22 is a rod 28ª which is adapted to control the throttle valve 29ª of the carburetor. This connection is so made that regardless of the speed of the motor when the brake is applied, the motor will be throttled down to a predetermined speed so that the brakes will not be set too rapidly. In fact it is my intention to apply the brakes of a motor vehicle at a predetermined motor speed and for this reason I have included the automatic throttle connection. The disk 16 is held in resilient engagement with the disk 11 by means of a coil spring 30. The purpose of this is to permit a certain amount of slippage between the disks 16 and 11 so that at no time will a positive engagement be made which would have a tendency to either set the brakes too tightly or else shear off or break the rods 26 and 27.

Figure 1:
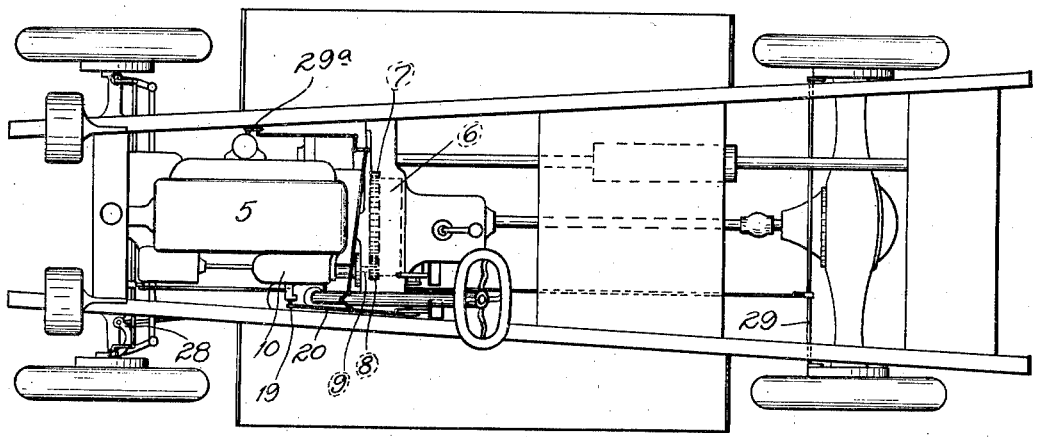
Fig. 1 is a top plan view of a motor chassis with my device attached thereto.
Figure 2:
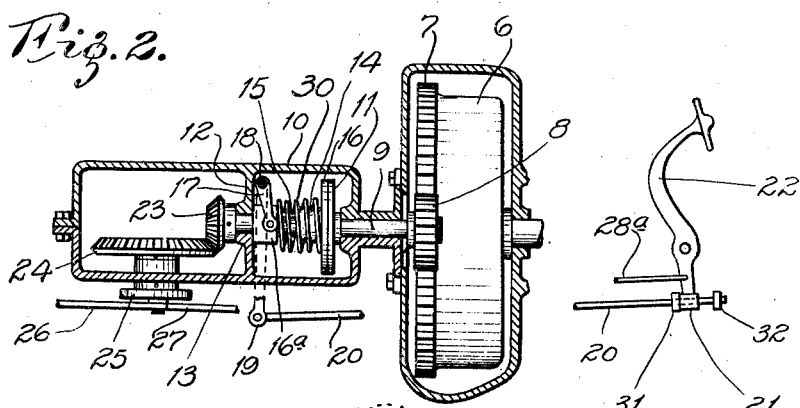
Fig. 2 is an enlarged sectional view illustrating the manner of operating the same.
Figure 3:
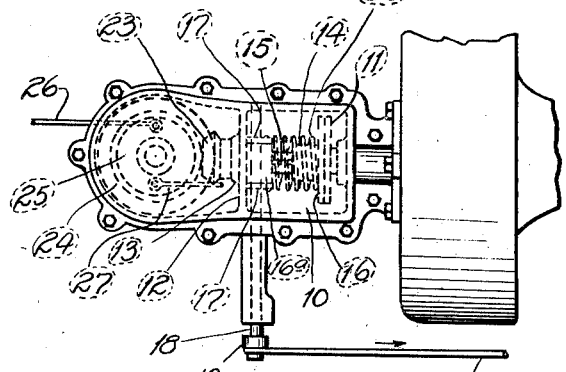
Fig. 3 is a top plan view of Fig. 2.

It will be noted from Fig. 2 that the rod 20 is provided with stops 31 and 32, the purpose of these stops being to permit the foot lever 22 being moved a certain distance and control the engine or motor speed before it commences to rock the lever 19 so as to bring the friction disks 11 and 16 into contact. It is to be understood, of course, that the spring 30 is interposed between the disk 16 and collar 16ª so that it will be impossible to tightly bind the friction disks against each other. This feature is essential because it is absolutely necessary that the disks 11 and 16 be so frictionally engaged that at no time will there be a possibility of making the engagement tight enough to wreck the braking mechanism.

My device may be used either for rear wheel braking alone or it may be used for four-wheel brakes. When used for four-wheel brakes, however, the ordinary connections to the brake bands on the front wheels are employed. There are various means of making these connections and, therefore, I do not specifically show any of such means and my device may be applied to any of the existing four-wheel mechanical braking constructions.

The operation of my device is as follows:

After the proper connection has been made and the vehicle is being driven along, for instance in low speed and it is desired to stop the same, the foot lever 22 is depressed. The first movement of this lever operates the throttle valve so as to give a predetermined motor speed. By the time this speed has been reached, which occupies a short period of time, the end 21 of the lever 22 contacts with the stop 32, rocks the lever 19 and fork 17 through the agency of the shaft 18 compressing the spring 30. This forces the disk 16 in frictional engagement with the disk 11, which is constantly driven by means of the shaft 9 and gear 8 which meshes with the gear teeth 7 on the fly wheel 6 of the engine. This frictional engagement will place in rotation the bevel gear 23 and the bevel gear 24 and cause the disk 25 to rotate in either direction of the arrow shown in Fig. 4. This rotation causes a pull in the case of four-wheel brakes on the rods 26 and 27 in opposite directions, thus setting the brakes, but a continued pull due to the resiliency of the spring 30 permits the friction disks or rather their contacting faces to slide on each other and thus prevent the brakes from being set too tight. In the event that the motor car is being driven at a high speed, the first movement of the foot lever 22 will be to operate the throttle valve 29 so as to reduce the speed of the motor and after the motor speed has been reduced, which takes only a short time and is permitted by reason of the movement between the stops 31 and 32, the friction disks 11 and 16 and the consequent setting of the brakes is the same as previously described.

In order to return the disk 25 to its original position and independently of the springs made use of for loosening the brakes, I may employ an additional extension spring 34. The stop 31 is for the purpose of contacting snugly with the end 21 of the pedal 22 and thereby prevents accidental moving of the rod 30.

Having fully described my invention, what I claim is:—

1. A power braking device comprising in combination with an automobile chassis having brakes, of a friction member in continuous connection with and driven by the flywheel of the motor of said chassis, a second friction member, means operated by said second friction member for setting said brakes, and means for moving said second friction member into resilient contact with said first mentioned friction member.

2. A power braking device comprising the combination with an automobile chassis having brakes, of a friction member in continuous connection with and driven by the flywheel of the motor of said chassis when said motor is in operation, a second friction member located adjacent the first mentioned friction member, means including gears operated by the second mentioned friction member for setting said brakes, and a pedal for moving said second mentioned friction member into resilient contact with said first mentioned friction member.

3. A power braking device comprising a friction member adapted for continuous connection and rotation with the flywheel of the motor of an automobile while the same is in operation, a second friction member adjacent said first mentioned friction member, means including bevel gears operated by said second mentioned friction member for placing the braking mechanism of a motor vehicle in operation, and foot operated means for moving said second mentioned friction member into resilient contact with said first mentioned friction member.

4. A power braking device comprising a friction member adapted to be in continuous connection and driven by the flywheel of a motor vehicle while the same is in operation, a second friction member, means including gears operated by the second mentioned friction member for operating the braking mechanism of a motor vehicle, a housing for said friction member and gears, and a foot operated lever mechanism for moving and yieldingly holding said second mentioned friction member in engagement with said first mentioned friction member.

5. A power braking device comprising the combination with an automobile chassis havings brakes and a motor having gear teeth on its flywheel of a housing located adjacent the flywheel, a shaft projecting from said housing, a gear mounted in said shaft and meshing with the teeth on the flywheel, a friction disk mounted on the shaft within said housing, a sleeve located in said housing in alignment with said shaft, a friction disk slidably secured on said sleeve, a bevel gear secured to the opposite end of said sleeve, a second bevel gear meshing with the first mentioned bevel gear, a shaft secured to said second mentioned bevel gear and projecting through a side wall of the housing, a disk secured on said shaft outside of said housing, a pin eccentrically secured to said disk, a rod pivotally carried at one end by said pin, its other end being attached to the brakes, and means including a spring for bringing said friction disks into resilient contact.

6. A power braking device comprising the combination with an automobile chassis having brakes and a motor having gear teeth on its flywheel of a housing located adjacent the flywheel, a shaft projecting from said housing, a gear mounted in said shaft and meshing with the teeth on the flywheel, a friction disk mounted on the shaft within said housing, a sleeve located in said housing in alignment with said shaft, a friction disk slidably secured on said sleeve, a bevel gear secured to the opposite end of said sleeve, a second bevel gear meshing with the first mentioned bevel gear, a shaft secured to said second mentioned bevel gear and projecting through a side wall of the housing, a disk secured on said shaft outside of said housing, pins eccentrically secured to said disk, rods pivotally carried at one end by said pins, their other ends being attached to the brakes, and means including a spring for bringing said friction disks into resilient contact.

In testimony whereof I have affixed my signature.

ELMER L. WILKINSON.